United States Patent

Musgrave

Patent Number: 6,105,010
Date of Patent: Aug. 15, 2000

[54] BIOMETRIC CERTIFYING AUTHORITIES

[75] Inventor: Clyde Musgrave, Frisco, Tex.

[73] Assignee: GTE Service Corporation, Irving, Tex.

[21] Appl. No.: 09/001,323

[22] Filed: Dec. 31, 1997

Related U.S. Application Data

[60] Provisional application No. 60/046,012, May 9, 1997, provisional application No. 60/067,182, Dec. 1, 1997, and provisional application No. 60/055,534, Aug. 13, 1997.

[51] Int. Cl.[7] .................................................. G06F 17/60
[52] U.S. Cl. ................................ 705/44; 705/39; 380/23; 380/25; 382/115
[58] Field of Search ................................ 705/1, 39, 44; 380/23, 25; 382/115–119

[56] References Cited

U.S. PATENT DOCUMENTS

| | | | |
|---|---|---|---|
| 4,109,237 | 8/1978 | Hill | 382/117 |
| 4,405,829 | 9/1983 | Rivest et al. | 380/30 |
| 5,214,699 | 5/1993 | Monroe et al. | 380/23 |
| 5,224,173 | 6/1993 | Kuhns et al. | 382/116 |
| 5,259,025 | 11/1993 | Monroe et al. | 380/23 |
| 5,291,560 | 3/1994 | Daugman | 382/117 |
| 5,386,104 | 1/1995 | Sime | 235/379 |
| 5,412,727 | 5/1995 | Drexler et al. | 380/24 |
| 5,428,357 | 6/1995 | Haab et al. | 341/155 |
| 5,457,747 | 10/1995 | Drexler et al. | 380/24 |
| 5,469,506 | 11/1995 | Berson et al. | 380/23 |
| 5,534,855 | 7/1996 | Shockley et al. | 340/825.3 |
| 5,581,630 | 12/1996 | Bonneau, Jr. | 382/116 |
| 5,619,620 | 4/1997 | Eccles | 706/20 |
| 5,623,545 | 4/1997 | Childs et al. | 708/250 |
| 5,719,950 | 2/1998 | Osten et al. | 382/115 |
| 5,748,738 | 5/1998 | Bisbee et al. | 380/25 |
| 5,787,186 | 7/1998 | Schroeder | 382/115 |
| 5,838,812 | 11/1998 | Pare, Jr. et al. | 382/115 |
| 5,892,838 | 4/1999 | Brady | 382/115 |
| 5,905,807 | 5/1999 | Kato et al. | 382/118 |

*Primary Examiner*—James P. Trammell
*Assistant Examiner*—Cuong H. Nguyen
*Attorney, Agent, or Firm*—Leonard Charles Suchyta

[57] ABSTRACT

A biometric certifying authority (BCA) management system and method provide and maintain a hierarchical relationship among biometric certifying authorities in the issuance of biometric certificates. Biometric certificates may be used in all electronic transactions requiring authentication of the participants, based on the accuracy and uniqueness of the biometric, which allows the electronic transaction to be insured to provide global standards for all electronic commerce. The BCA management system includes a transaction request parser which extracts a biometric certificate signal and transaction-type data from a electronic transaction request. A biometric verification processor verifies the biometric certificate signal against previously stored biometric data in a database. The biometric verification processor generates a verification message corresponding to the authenticity or fraudulent status of the biometric certificate signal. A transaction type classifier receives the electronic transaction request, and generates a classification message according to the transaction-type data. A certifying authority processor generates an access-or-denial message to indicate the status of the electronic transaction, and to report the classification of the transaction request.

20 Claims, 2 Drawing Sheets

BIOMETRIC CERTIFYING AUTHORITIES

This application claims benefit of provisional applications 60/046,012, filed May 9, 1997, 60/067,182, filed Dec. 1, 1997 and 60/055,534, filed Aug. 13, 1997.

BACKGROUND OF THE INVENTION

1. Field of the Invention

This disclosure relates generally to the field of secure communications, and in particular to the issuance and management of biometric certificates in a hierarchy of biometric security systems.

2. Description of Related Art

Electronic transactions may involve diverse types of activities, such as the exchange of information, the permitted entry and access of a person to a facility, and the output of goods or cash to a person. Despite the common need for security, different activities may have different levels of security, and so different activities may utilized different security techniques.

Existing certifying techniques, such as personal certificates employing, for example, passwords and personal information numbers (PINs), have not provided sufficient security since PINs and passwords are often easily guessed, hard to remember, and/or subject to exhaustive or brute-force automated searches.

Digital certificates have emerged as a leading candidate for authenticating electronic transactions. Ideally, digital certificates, such as those defined by the X.509 and ANSI X.9 standards, allow users, buyers, and/or sellers to authenticate electronic documents and transactions in a manner analogous to the authentication of documents by a Notary Public. The combination of public key cryptography and the use of digital certificates provides integrity, privacy and a degree of authentication for on-line transactions to instill a new level of confidence in the electronic services consumer.

While digital certificates improve electronic authentication, they fall short of actually authenticating the persons involved, as digital certificates by themselves only authenticate the private cryptographic key used in the transaction or signature. Since these private keys are physically stored on computers or other electronic storage devices, such private keys are not physically tied to or a part of a person, but are merely associated with the person.

Recently, access to electronic services has been facilitated through identification and security techniques using biometric certificates, such as described in U.S. patent application No. 60/046,012, entitled "BIOMETRIC CERTIFICATES" by Clyde Musgrave et al., which is incorporated herein by reference. Such biometric certificates are useful to authenticate the identity of a person and to bind the biometric of the person to a transaction via a digital certificate. Such biometric certificates may be used as a spoof-proof method for recognizing individuals within an end-to-end secure electronic transaction.

As different electronic transactions may require different levels of security, a need exists for controlling the generating, distributing, revoking, and maintaining of biometric certificates through one or more biometric certifying authorities (BCAs). Such a BCA control system should provide insurability of issued biometric certificates for different electronic transactions.

SUMMARY OF THE INVENTION

It is recognized herein that a hierarchical approach and evaluation procedure for the issuance of biometric certificates insures specific levels of security for specific types of electronic transactions.

A biometric certifying authority management system and method provide and maintain a hierarchical relationship among biometric certifying authorities in the issuance of biometric certificates. Biometric certificates may be used in all electronic transactions requiring authentication of the participants, based on the accuracy and uniqueness of the biometric, which allows the electronic transaction to be insured to provide global standards for all electronic commerce.

The biometric certifying authority (BCA) management system includes a transaction request parser, which responds to receiving an electronic transaction request having transaction-type data and a biometric certificate signal. The request parser operates to extract the biometric certificate signal and the transaction-type data from the electronic transaction request. A biometric verification processor receives the biometric certificate signal, and verifies it against previously stored biometric data in a database. Based on the verification, the biometric verification processor generates a verification message corresponding to the authenticity or fraudulent status of the biometric certificate signal. A transaction type classifier receives the electronic transaction request, and generates a classification message associated with the electronic transaction request according to the transaction-type data. A certifying authority processor responds to the verification message, and operates to generate an access-or-denial message to indicate the status of the electronic transaction, and to report the classification of the transaction request.

A billing rate database stores billing rates corresponding to transaction classifications, and the certifying authority processor responds to the classification of the transaction request and operates to retrieve a corresponding billing rate from the billing rate database. The certifying authority processor generates a bill for payment in performing the transaction authentication associated with the generation of the access-or-denial message.

BRIEF DESCRIPTION OF THE DRAWINGS

The features of the disclosed biometric certifying authority management system and method are readily apparent and are to be understood by referring to the following detailed description of the preferred embodiments of the present invention, taken in conjunction with the accompanying drawings, in which.

DESCRIPTION OF THE PREFERRED EMBODIMENTS

Figure 1:
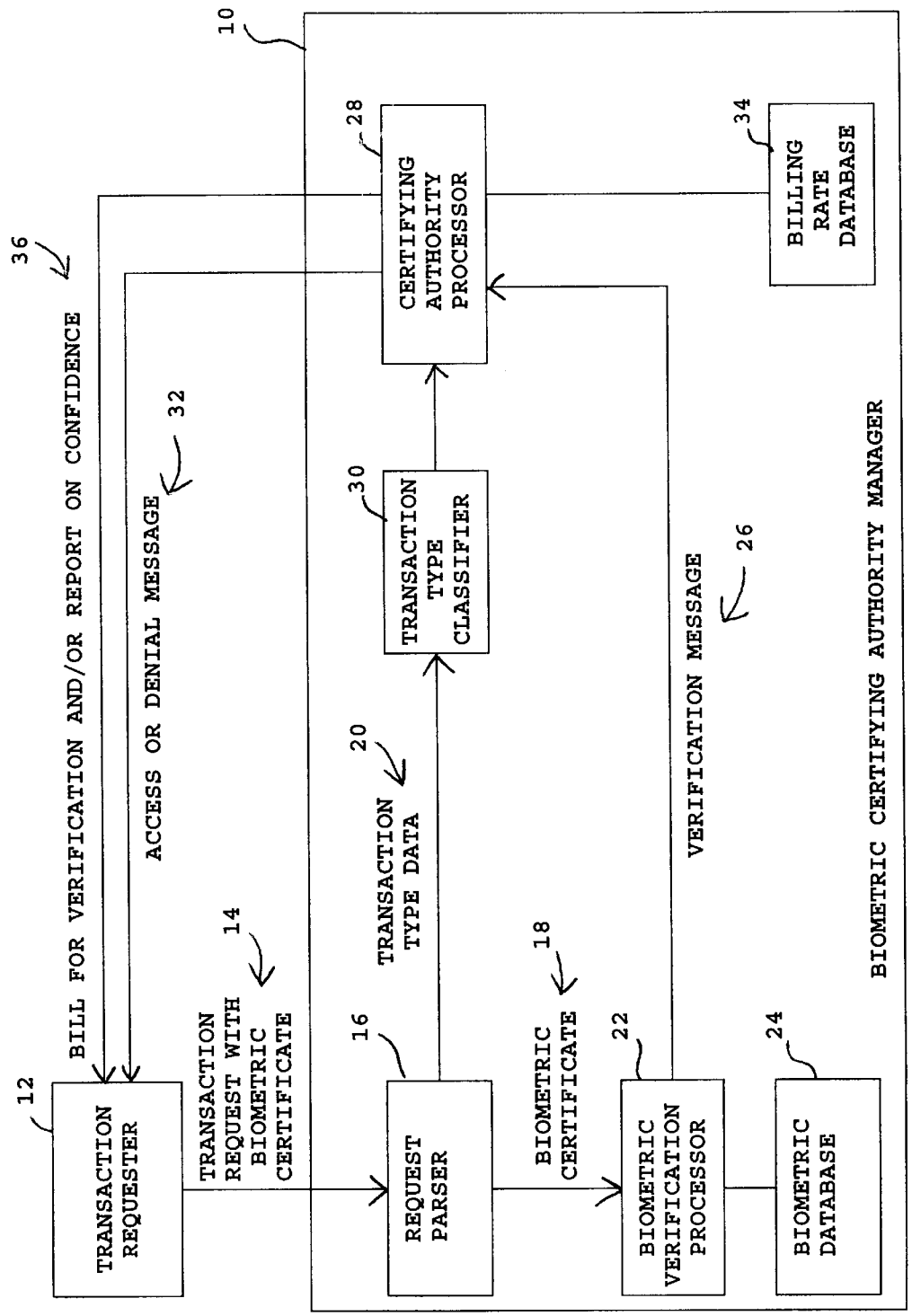
FIG. 1 illustrates a schematic of the disclosed biometric certifying authority management system.

Referring in specific detail to the drawings, with common reference numbers identifying similar or identical elements, steps, and features, as shown in FIG. 1, the present disclosure describes a biometric certifying authority management system and method of use for providing and maintaining a hierarchical relationship among biometric certifying authorities in the issuance of biometric certificates. The hierarchical approach and evaluation procedure in the issuance of biometric certificates insures specific levels of security for specific types of electronic transactions.

As shown in FIG. 1, the biometric certifying authority management system and method include a biometric certifying authority (BCA) manager 10 operatively connected to a transaction requester 12, for example, via telephone lines, Internet connections, wireless communication channels including satellite channels, etc. In a preferred embodiment, the BCA manager 10 is incorporated into a BCA of a data provider or electronic transaction processor, and the transaction requester 12 is, for example, a consumer attempting to electronically purchase software, goods, or information. Alternatively, the transaction requester 12 is a person or entity requesting physical or electronic entry into a facility.

In an alternative embodiment, the transaction requester 12 may be a biometric certifying authority (BCA) which itself handles transactions between entities such as banks and consumers using biometric certificates, and which accesses the BCA manager 10 in order to authenticate the electronic transaction.

The transaction requester 12 sends a transaction request 14 to the BCA manager 10, with the transaction request 14 including a biometric certificate 18; for example, of an electronic fund transfer between a bank customer and a bank through an automated teller machine (ATM). The ATM may have a biometric scanner and software for generating the biometric certificate from the physical characteristics of the bank customer.

The BCA manager 10 processes the transaction request using a request parser 16, which extracts the biometric certificate 18 and data 20 indicating the type of transaction. Other data involving the specific transaction, such as the identity of the customer and an amount of money to be withdrawn from an ATM, is handled by other transaction processors (not shown in FIG. 1), which may be incorporated in or external to the BCA manager 10.

The BCA manager 10 has the biometric certificate 18 verified using a biometric verification processor 22 which retrieves archived biometric data of the person or entity involved in the transaction from a biometric database 24. The biometric verification processor 22 then compares the retrieved biometric data with the biometric data of the biometric certificate 18. Alternatively, the biometric verification processor 22 searches the biometric database 24 for a set of biometric data corresponding to the biometric data of the biometric certificate 18.

The biometric verification processor 22 then generates a verification message 26, indicating whether or not the biometric certificate is authentic, based on the biometric data stored in the biometric database 24. The verification message 26 may merely be a logic 1 or TRUE Boolean value indicating authenticity, or a logic 0 or FALSE Boolean value indicating a lack of authenticity being detected by the biometric verification processor 22. Alternatively, other messages or coding may be generated by the biometric verification processor 22 as the verification message 26, for example, the degree of authenticity.

The verification message 26 is then sent to a certifying authority processor 28 to indicate an authentication or a detection of fraud.

Figure 2:
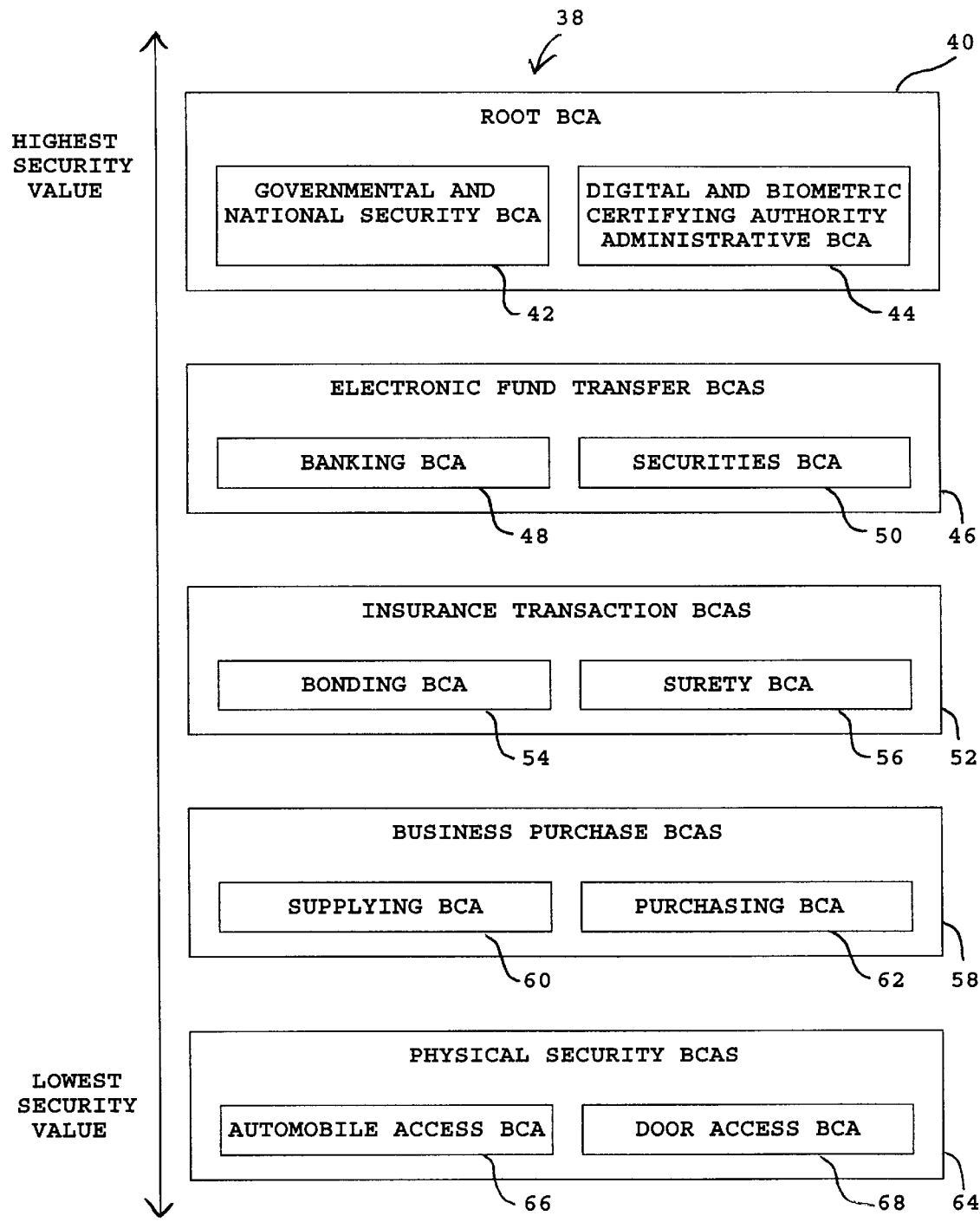
FIG. 2 illustrates the hierarchy of biometric certifying authorities employed by the biometric certifying authority management system of FIG. 1.

The transaction type data 20 is sent from the request parser 16 to a transaction type classifier 30 to determine the type of transaction and the corresponding level of security required of the transaction, according to a predetermined hierarchy shown, for example, in FIG. 2. The transaction request 14 may include a transaction code as the transaction type data 20 for indicating the type of transaction involved. The transaction type classifier 30 may then compare the transaction code with a set of predetermined transaction codes which may be stored, for example, in a transaction code table or database. The transaction type classifier 30 may then generate a security level code which is output to the certifying authority processor 28.

Upon receiving the verification message 26 and/or the security level code, the certifying authority processor 28 generates a response to the transaction requester 12. If the verification message 26 indicates authentication of or a failure to authenticate the biometric certificate 18, the certifying authority processor 28 generates an access or denial message 32, respectively. In one embodiment, the access or denial message 32 is sent to the transaction requester 12 for further processing of the transaction request 14. The access or denial message 32 may merely be a logic 1 or TRUE Boolean value indicating access granted, or a logic 0 or FALSE Boolean value indicating a denial of access. Alternatively, the access or denial message 32 may include a report on confidence of the authenticity, such as a percentage value indicating the percentage of confidence in the authenticity for an access indication, or lack thereof for a denial indication.

In alternative embodiments, the access or denial message 32 is sent to a data provider (not shown in FIG. 1) for complying with the transaction request 14, such as retrieving and sending software or music data corresponding to the transaction request 14. In another alternative embodiment, the data provider may be a controller to an ATM for outputting cash, or the data provider may be a goods ordering system for causing selected goods corresponding to the transaction requests 14 to be sent to the transaction requester 12.

In conjunction with or independent of the access or denial message 32, the certifying authority processor may access a billing rate database 34 for generating a bill 36 or charge for the process of verifying and/or for providing a report on the confidence of the authentication or lack thereof. The billing rate database 34 may also include a table or database of insurance rates for charging the transaction requester 12, in the bill 36, to indicate a level of insurance commensurate with a level of security insured by a positive authentication by the BCA manager 10. Alternatively, the billing rate database 34 may specify a percentage of the transaction amount or value involved.

For example, for a $10,000 loan, the BCA manager 10 may charge about 1% to about 10% of the value, that is, between $100 and $1,000 to certify and insure the authentication of the user requesting the transaction. For large transaction values, the percentage fee may be, for example, progressively higher to ensure authenticity. In alternative embodiments, different biometric data may be required for different transaction amounts. For example, physical access to a building has a relatively low transaction amount, since the ability of a fraudulent person gaining access to a building to inflict large financial losses may be reduced by redundant authentication systems throughout the facility. On the other hand, million dollar transfers between bank accounts have very high transaction values, since the transaction, once completed, may be difficult or impossible to retrieve from recipient accounts or banks if the authentication is faulty.

The bill 36 with the insurance charge may be in the form of a credit card transaction pre-authorized by the transaction requester 12 as a pre-established authentication and insurance service with the BCA manager 10. In this manner, the BCA manager 10 exchanges guarantees of authentication for payment of insurance and/or authentication charges, and so electronic transactions may be conducted with greater assurance of security and authenticity.

As shown in FIG. 2, the transaction type classifier 30 may classify transactions from different BCAs according to the predetermined hierarchy 38 of electronic transactions and BCAs conducting such electronic transactions. For example, all BCAs shown in FIG. 2 may be associated with a root BCA 40 having the highest degree of security. The root BCA 40 may have associated therewith electronic transactions involving governmental and national security BCAs 42 as well as various digital and biometric certifying authority administrative BCAs 44. Such BCAs merit the greatest levels of security and correspondingly the greatest security values, since such BCAs 42, 44 involve agencies and systems which monitor and secure other electronic systems such as other BCAs.

For example, on a scale of 1 to 10, the BCAs 42, 44 in the root BCA 40 may be assigned a security value of 10, requiring the greatest accuracy in authentication of biometric certificates in electronic transactions.

The next lower level of the hierarchy 38 includes electronic fund transfer BCAs 46 such as banking BCAs 48 and securities BCAs 50 for providing biometric certificates involved in secure electronic transactions of money, money-related entities, and money-related information. On a scale of 1 to 10, the electronic fund transfer BCAs 46 may be assigned a security value of 8.

The next lower level of the hierarchy 38 includes insurance transaction BCAs 52 such as bonding BCAs 54 and surety BCAs 56 for providing biometric certificates for secure electronic transactions involving, for example, insurance and guarantee payment contracts. On a scale of 1 to 10, the insurance transaction BCAs 52 may be assigned a security value of 6.

The next lower level of the hierarchy 38 includes business purchase BCAs 58 such as supplying BCAs 60 and purchasing BCAs 62 for providing biometric certificates for secure electronic transactions, for example, to order and ship goods. Such electronic transactions may include electronic bills of lading, electronic letters of credit, etc. On a scale of 1 to 10, the business purchase BCAs 58 may be assigned a security value of 4.

The next lower level of the hierarchy 38 includes physical security BCAs 64 such as automobile access BCAs 66 and door access BCAs 68 for providing biometric certificates for car doors, building and office doors, residences, etc. Such BCAs may be disposed at the physical location, such as being built into the body of an automobile, or may be remote such as being implemented by a central security station of an office building or laboratory. In addition, such physical security BCAs 64 may be implemented in airports and individual airplanes for use in or supplemental to the verification of alleged passengers prior to boarding an airplane. On a scale of 1 to 10, the physical security BCAs 64 may be assigned a security value of 2.

It is understood that the list of BCAs in the hierarchy 38 is not exhaustive and that the order of the BCAs may be implemented in different configurations, provided that each type of BCA is associated with a security value. In addition, individual BCAs within a specific type of BCA may be differentiated with unique or diverse security values. For example, within the electronic fund transfer BCAs 46, the banking BCAs may be assigned security values of 8.8 while the securities BCAs may be assigned security values of 8.4, such that banking transactions are required to be more secure than securities transactions, and so are charged more for authentication.

In addition, individual entities may request and/or pay the BCA manager 10 to set higher and/or lower security values. For example, instead of a security value of 8.8, an institution such as "CHASE MANHATTAN BANK" may pay a fee to have a security value of 9.5, to not only have greater security in electronic fund transfers but also to be able to advertise that their transactions are more secure than transactions of competitor banks. Alternatively, regulatory agencies may mandate that certain entities, such as banks, have a requisite minimum security level for BCAs within the hierarchy 38. Further, such regulatory agencies may require certain entities advertise and otherwise inform consumers of the security ratings of transactions. For example, the Federal Trade Commission (FTC) may mandate that automobile makers, such as "FORD MOTOR COMPANY", inform automobile purchasers or renters that their "FORD" automobiles either lack a BCA system for physical security and access, or have a predetermined BCA security rating.

For businesses in general, there are about $10 million to about $100 million in fraud reserve funds collected and maintained annually. Business generally have about 100,000 to 500,000 electronic transactions per month, with fraud levels amounting from about $10 million to about $100 million annually. Generally, about 10,000 to 100,000 participants are involved in electronic transactions, with a market size greater than $1 billion per year. Accordingly, to implement BCA managers 10 and the BCA security hierarchy 38, businesses are clearly able to support the costs of biometric certificate hardware and software.

Such requirements of the BCA manager 10 for electronic transactions are designed with the thought that a business having a perception or a reality of fraud at the above levels is clearly able to afford to take a substantial financial risk in order to put into place a BCA management system to eliminate fraud and to preserve their brand name recognition. The initial costs on a per unit basis and the cost of the infrastructure necessitate a business application with a large financial opportunity. As is typical with technology developments, it is estimated that the cost of the components implementing biometric certificates and BCA managers 10 rapidly diminishes in cost and makes many other market opportunities appealing for the application of biometric certificates.

In line with this logic, three opportunities have emerged with matching characteristics. The operational scenarios for these three typical marketplaces are described below which illustrate the application of biometric certificates, BCAs, and the BCA manager 10. The actual market entry strategy for each business scenario is to be defined in detail in a next phase; that is, a detailed business plan phase.

1. Potential Market Entry Strategy 1: the application of biometric certificates has the opportunity to provide insured ticketing transactions to a customer reservation center (CRC). It is estimated that there are about 200,000 electronic transactions per month per CRC, amounting to about $2.1 million per year per CRC with each CRC having about 10,000 users/customers. The annual revenue from ticket sales is about $1.1 billion for typical tickets priced at greater than $500/ticket per CRC.

Customers may include "AMERICAN EXPRESS", "HEWLETT-PACKARD", "XEROX", small ticket agencies, all major corporations, etc. There are multiple customer reservation centers globally, with an approximate fraud exposure of about $10 million to $100 million per CRC. Sources of fraud include a) customers which are billed for tickets they did not order; and b) CRC employees who commit fraud with tickets billed to a company.

The Airline Reservation Center (ARC) is a regulatory agency for CRCs which requires the CRCs to pay fines plus penalties as well as the cost of the fare for unidentified tickets. One known CRC has been assessed at $122,000 in penalties per week from the ARC.

The needs of the marketplace for such CRCs include travel agencies and reservation centers which order tickets electronically through the CRC. Each agency is identified by an assigned number which appears on the ticket and on a record of the transaction. The assigned number may be overridden through the system. When this number is changed, there is no audit trail to identify the agency which printed the ticket. If the agency is not identified, the CRC is charged the cost of the ticket, a penalty, and a fine. The CRCs need a means for identifying the originator of the ticket to reduce risks inherent in the process.

The customers of CRCs include initial customers of travel organizations and their reservation centers in major corporations such as "XEROX", "AMERICAN EXPRESS", "GTE", "EDS" and many others. Once BCAs are implemented initially in such organizations, the opportunities for other applications of biometric certificates within those organizations increases.

The use of biometric certificates fits well with such organizations, since the application of biometric certificates has several attractive elements in addition to the ones identified above. There is an urgency to solve unauthorized billing because of the fines and penalties and the requirement to re-pay the tickets. The captive nature of the relationships and the generally unchanging nature of the people make for an opportunity with the advantages of fraudproofing and early investment re-coupment.

2. Potential Market Entry Strategy 2: web-based information is reaching a privileged, high-income minority. The public access market, via kiosks, for banking, retail and government sectors involves input/output (I/O) devices to connect large sets of people to information and services. Basically kiosks represent the "People's Internet". The characteristics of the kiosk access points are:

a) kiosks are highly secure, sometimes more secure than ATMs because such kiosk may not dispense cash and are more secure than the desktop applications;

b) kiosks are completely sealed;

c) kiosks have control of the hardware-software-network environment in which the kiosks are used;

d) kiosks are able to leverage existing internet protocol (IP)-based investments; and e) kiosks may be easily adapted to existing websites using touchscreen interfaces.

The initial market application for biometric certificates and kiosks is with respect to the portion of the population sometimes referred to as the "Un-banked"; that is, up to 25% of urban population who do not have bank accounts, especially in major population centers such as New York City and Los Angeles. Nationwide, about 10% of the population, or about 12 million families do not have bank accounts.

Such a lack of banking access is due to language, culture, and immigration issues, which further reduces the participation of such un-banked people in commerce. Further, a lack of checking accounts, credit/debit cards, E-Commerce gateways, etc. limits the mobility of such un-banked people, who often constitute and are involved in an exclusive-cash economy. The ability to apply biometric certificates to electronic transactions for such un-banked people is a huge, high-growth opportunity.

The security concerns of such electronic transactions is problematic, since there is generally a lack of uniform identification in large segments of the population. About $1 billion to $2 billion in check cashing transaction fees per year are collected, with fraud levels at about 10%.

The current needs of the marketplace involve check cashing facilities which take a portion of the face value or a fixed fee of each check cashed. The type of checks are typically government entitlement programs such Medicare, Medicaid, Social Security, Aid to Dependent Children, Food Stamps, Veteran's benefits, etc. The size of fraud in the Medicare and Medicaid programs alone is estimated at over $40 Billion. A portion of this fraud is attributable to check cashing fraud and lack of positive identification of the persons involved.

A clear direction for addressing such fraud is for large government programs to require positive identification of employees as well as beneficiaries. Generally, the un-banked or under-banked usually are served by banks at a loss or are not accepted as customers. The banking community is fundamentally unprepared to serve low income customers. According to a recent McKinsey study, a key direction is to "provide low income clients with affordable banking products focused on satisfying their basic financial needs via a low cost platform that leverages alternative channels, provides incentives for using electronic transactions, and provides convenient, no-frills service".

The product lines for the un-banked are to be focused initially on satisfying only basic needs such as transaction amounts. Later products to satisfy customer wants, such as home loans, and tailored products, such as retail sales, may be added. Initially, competitive pricing focused on capturing or maintaining market share may be considered to assure at least a minimum profit. Typical products initially include savings accounts, unemployment accounts, classic credit cards, revolving lines of credit, salary backed credit, automatic bill payments, ATM/debit cards, etc. Further, combinations of products are very attractive and important, such as salary-backed credit, automatic bill payments and classic credit cards tied together and tied to the individual's work performance.

The use of alternative channels is one of the most important elements for reaching the under-banked, who tend to have a radically higher use of alternative channels than the bankable population. However, the higher use of these alternative channels, such as kiosks, has to be given an incentive or has to be forced upon the un-banked to reduce fraud via a number of pull/push migration levers. It is important to note that not all customers may perceive these channels as more convenient, but banks cannot afford to serve the under-banked in traditional branches.

Globally, survey data indicates that 55%–73% of the customers of South Africa, Peru, Brazil, and other countries are "enthusiastic" about kiosks and banking for the under-banked. A clear set of derived conclusions are that it is important to:

a) focus on low income customers, which may be fundamental to many retail financial institutions both in major cities in the U.S. as well as in emerging and developed markets globally in the near future, given increased competition in other more affluent segments;

b) learn how to serve these customers, which allows financial institutions to develop skills that are useful in serving other segments of the population; and c) improve a financial institution's capabilities to serve low income customers, which may be interpreted as the acquisition of an option to enter a market which in most countries is bound to have explosive growth in the future.

The McKinsey report indicates that customers, both bankable and under-banked, accept new concepts of service delivery and are willing to use alternative channels, such as kiosks, for new products and services. The incentive system remains the toll to prevent migration and churn. The economics are able to work, depending on the size of the existing customer base and the opportunities to leverage existing infrastructure or other adjacent applications, such as entitlement programs. This creates a dual-use channel in banking the under-banked and entitlement program access. The timescales to break-even are variable but improve dramatically with positive identification and authentication of the under-banked.

Biometric certificates fit well in this scenario, since biometric certificates create a new standard for secure identification (ID) methods. Electronic commerce in this scenario is keyed to cashless smartcards, with guaranteed security and insured validation of every transaction. Since cyberspace is relatively new, standards/laws for the cyberspace marketplace and commerce are evolving, and so cyberspace is ideal for experimenting with new paradigms.

The applications of biometric certificates using BCA managers 10 may be expanded to the government and the population, delivering biometric certificate security benefits after prototyping with the un-banked. Higher-value transactions may then be built and implemented, with nominal fees being charged such as $1.00 to $2.00 per transaction.

Example applications include:
 a) banking for the un-banked;
 b) enrollment with a biometric ID;
 c) establishment of bank accounts through public access kiosks;
 d) choice of account types;
 e) opening an account;
 f) ordering checks;
 g) performing a change of address;
 h) applying for special government loans: auto, home, personal, family, low-income, small-business, etc.;
 i) retrieving tax information;
 j) purchasing retirement and educational savings products;
 k) obtaining a guaranteed credit card; and
 l) requesting and/or printing a credit history.

Companies such as GTE may also implement such biometric certificate services and the BCA manager 10 for telephone applications, to allow a person to order services; to implement calling card and long distance telephone calls; and to access applications involving the Internet, the World Wide Web, and "SUPERPAGES".

Accordingly, by using existing devices and systems such as telephones, ATMs, and kiosks to implement biometric certificates using the disclosed BCA manager 10, every person and every transaction may be validated with biometric certificate technology.

3. Potential Market Entry Strategy 3: biometric certificates have the opportunity to provide insured transactions to subscription services for financial information, such as "TRW/EXPERIAN", "EQUIFAX", and others. Such services are estimated to have 100,000 subscribers who generate 200 million transactions per year, with an average transaction fee of about $3.00. Each subscription service generates an annual revenue of about $600 million per year, being about $300 million in the U.S. and $300 million outside the U.S. per year. The customers of such subscription services typically include mortgage lenders, banks, credit card companies, payment systems, etc.

The needs of the marketplace for biometric certificates for subscription services include allowing customers to order products on credit electronically through a private network. The size of fraud in such subscription services is virtually unknown, but the approximate fraud exposure is about $10 million to $100 million. The lack of security prevents these companies from putting new and more valuable products up on their private networks. By putting new products up in a system with mutual trust using biometric certificates and the BCA manager 10, these companies are able to increase their per-transaction revenue and build a larger brand name.

The initial customers are the captive subscribers in the credit bureaus on existing client lists. Higher subscription fees may be charged to offset the cost of the biometric scanners and related costs involved in obtaining biometric data at the transaction requester 12 to generate the biometric certificate 18, as shown in FIG. 1. Pricing models based on revenue per transaction may be viable.

Biometric certificates fit well with such subscriber services, since there is an urgency to solve the identity problem because of recent unauthorized accesses to private networks. The captive nature of the relationships and the generally unchanging nature of the people allow the use of biometric certificates and pre-stored biometric databases 24 in FIG. 1 to be an opportunity with the advantages of fraudproofing and early investment recoupment.

All of the above potential market entry strategies have typical and initial markets with a requirement that users be enrolled at an approved Biometric Certifying Enrollment Station (BCES) (not shown in FIG. 1), which may be connected to or incorporated within the transaction requester 12 and/or the BCA manager 10. The BCES has telecommunications connections to a BCA, and performs an enrollment procedure to obtain biometric data from the enrollee. The BCES may then generate an enrolling biometric certificate incorporating the biometric data, which is then sent to a BCA to cause the enrollee to be subsequently identified by later biometric scans and comparisons with the enrolling biometric data.

While the disclosed biometric certifying authority management system 10 and method are particularly shown and described herein with reference to the preferred embodiments, it is to be understood that various modifications in form and detail may be made therein without departing from the scope and spirit of the present invention. Accordingly, modifications, such as any examples suggested herein, but not limited thereto, are to be considered within the scope of the present invention.

What is claimed is:

1. A biometric certifying authority (BCA) management system comprising:
 a transaction request parser for receiving a request to authenticate an electronic transaction having transaction-type data and a biometric certificate signal, the request parser operating to extract the biometric certificate signal and the transaction-type data from the request;
 a biometric verification processor which receives the biometric certificate signal, determines an authenticity of the biometric certificate signal based on previously stored biometric data in a database, and based on the determination, generates a verification comprising one of an authentic status and a fraudulent status of the biometric certificate signal;
 a transaction type classifier for receiving the transaction type data and for determining a security level associated with the electronic transaction based on at least one of the transaction-type data and a predetermined hierarchy of electronic transactions; and a certifying authority processor for generating an access-or-denial message based on at least one of the verification and the security level.

2. The BCA management system of claim 1 wherein the certifying authority processor generates a confidence level value based on at least the predetermined hierarchy of electronic transactions.

3. The BCA management system of claim 1 wherein the predetermined hierarchy is a list of rankings of BCAs according to predetermined security and authentication levels.

4. The BCA management system of claim 1 further comprising:

a billing rate database for storing billing rates corresponding to transaction classifications; and wherein the certifying authority processor, responsive to the classification of the transaction request, retrieves a corresponding billing rate from the billing rate database and generates a bill for payment in performing the transaction authentication associated with the generation of the access-or-denial message.

5. The BCA management system of claim 4 wherein the billing rate database stores billing rates which increase for corresponding transaction classifications having greater associated security and authentication levels.

6. The BCA management system of claim 4 wherein the bill is a charge for insurance to insure an authentication of the electronic transaction.

7. A biometric certifying authority (BCA) management system for authenticating an electronic transaction request, including a biometric certificate signal and transaction-type data, comprising:

a biometric verification processor which receives a biometric certificate signal, verifies the biometric signal based on biometric data in a database, and generates a verification comprising one of an authentic status and a fraudulent status of the biometric certificate signal;

a transaction type classifier which receives the request and generates a security level associated with the electronic transaction based on at least one of the transaction-type data and a predetermined hierarchy of electronic transactions;

a billing rate database which stores a plurality of billing rates corresponding to a plurality of security levels; and a certifying authority processor for generating an access-or-denial message based on at least the verification, the certifying authority processor further operative to retrieve a corresponding billing rate from the billing rate database, and to generate a bill in accordance with the billing rate for the access-or-denial message.

8. The BCA management system of claim 7 wherein the bill is a charge for insurance to insure an authentication of the electronic transaction.

9. The BCA management system of claim 7 wherein the certifying authority processor generates the bill according to the predetermined hierarchy of electronic transactions.

10. The BCA management system of claim 9 wherein the billing rate database stores billing rates which increase for corresponding transaction classifications having greater associated security and authentication levels.

11. The BCA management system of claim 7 wherein the predetermined hierarchy is a list of rankings of BCAs according to predetermined security and authentication levels.

12. The BCA management system of claim 11 wherein the predetermined hierarchy includes rankings of BCAs from a group including at least one of: root BCAs, electronic fund transfer BCAs, insurance BCAs, business purchase BCAs, and physical security BCAs.

13. A method for authenticating a request for an electronic transaction, comprising the steps of:

receiving a biometric certificate signal and transaction-type data associated with a request for authenticating an electronic transaction;

comparing the biometric certificate signal to predetermined biometric data;

generating a verification comprising one of an authentic and a fraudulent status of the biometric certificate signal, based on the comparing step;

classifying the request according to the transaction-type data;

generating, in response to the verification, an access-or-denial message to indicate one of the authentic and the fraudulent status of the electronic transaction;

retrieving a billing rate from a billing rate database according to the classification of the request, wherein the billing rate database stores a plurality of billing rates corresponding to plurality of transaction types; and generating a bill, in accordance with the billing rate, for performing the request.

14. The method of claim 13 wherein the step of verifying includes the steps of:

retrieving first biometric data from a biometric database;

retrieving second biometric data from the biometric certificate signal; and comparing the first and second biometric data.

15. The method of claim 13 wherein the step of generating the bill includes the step of:

generating a confidence level value of the access-or-denial message according to a predetermined hierarchy of electronic transactions.

16. The method of claim 15 wherein the predetermined hierarchy is a list of rankings of biometric certifying authorities (BCAs) according to predetermined security and authentication levels.

17. The method of claim 16 wherein the predetermined hierarchy includes rankings of BCAs from a group including at least one of: root BCAs, electronic fund transfer BCAs, insurance BCAs, business purchase BCAs, and physical security BCAs.

18. The method of claim 13, further comprising the steps of:

receiving the request incorporating the transaction-type data and the biometric certificate signal; and parsing the electronic transaction request to extract the biometric certificate signal and the transaction-type data therefrom.

19. The method of claim 13 wherein the step of storing includes the step of storing billing rates in the billing rate database, with the billing rates increasing for corresponding transaction classifications having greater associated security and authentication levels.

20. The method of claim 13 further comprising the step of:

transmitting the bill to a transaction requester which submitted the request as a charge for insurance to insure an authentication of the electronic transaction.

* * * * *